BIPOLAR DIGITAL TO ANALOG CONVERTER

Filed Dec. 24, 1964 2 Sheets-Sheet 1

INVENTOR.
DAVID H. SKRENES

BY Richard H. Smith

AGENT

United States Patent Office 3,403,393
Patented Sept. 24, 1968

3,403,393
BIPOLAR DIGITAL TO ANALOG CONVERTER

David H. Skrenes, Rochester, Minn., assignor to International Business Machines Corporation, Armonk, N.Y., a corporation of New York Filed Dec. 24, 1964, Ser. No. 420,879
7 Claims. (Cl. 340—347)

ABSTRACT OF THE DISCLOSURE

A bipolar digital to analog converted for use with a complementary numbers system including a resistance network made up of a plurality of weighted summing resistors connected to an output terminal at one end and selectively switched between either two voltages at the other end. A further similar voltage device is provided at the output terminal, which responds in accordance with the value of a sign digit to shift the output voltage into the negative range.

The present invention relates to bipolar digital to analog converters and, more particularly, to such a converter which is readily suited for operation in a system where numbers of equal magnitude and opposite sign are represented by complementary digit groups including magnitude digits and a sign digit.

Devices which are adapted to convert a digital representation to a proportional voltage level are necessary elements in many types of analog to digital converters, in devices which provide communication between a digital computer and an analog display or control device, in the feedback control elements of many types of servomechanisms, and in many different forms and combinations of these several types of systems.

As is well known, one of the simplest and most effective digital to analog converters is a resistance network comprising a plurality of weighted summing resistors, each resistor having one end conneted to an output terminal and having its other end connected to the switch-arm of a single pole multi-throw switch. The corresponding terminals of each switch are connected in common to the corresponding terminals of a multi-level voltage supply. Each summing resistor and its associated switch represents a different digital position of an input number with the impedance value of each summing resistor being proportional to the numerical weight of the corresponding digital input position. By setting each switch to the terminal representative of the value of the digit in the corresponding digit position of the input number, a voltage level is established at the output terminal which is proportional to the input number.

For conversion of binary input numbers only a two level voltage supply and double-throw switches are required. This is because the radix of the binary number system is two, indicating that there are only two possible digit values for each digit position. Also, the impedance values of the summing resistors are weighted in accordance with a geometric series having a common ratio of two.

In many types of computing systems, processing of positive and negative quantities is accomplished through the use of a complementary digit representation scheme in order to simplify arithmetic operations. A complementary digit scheme is one in which the digit groups representative of positive and negative quantities of equal magnitude are complementary, in some manner, to one another.

For example, in the binary system a plus five is represented by 00101 (low order digit position to the right). If the system was set up to express negative numbers as the one's complement of corresponding positive numbers, a minus five quantity would be represented by 11010, which is simply an inversion of each of the digit values of the positive representation. In a two's complement system, a minus five would be 11011, which is the one's complement plus one. Of course, in order to distingush between positive and negative numbers, one bit position of the digital representation must be reserved for sign indication and can have no magnitude significance. This digital position is referred to as the "sign digit" while the remaining positions, which represent the numerical quantity, are referred to as the "magnitude digits." It is to be noted that in any scheme where digital complements plus a sign digit are employed to represent sign, the magnitude digit sets for positive and negative quantities are identical digital progressions with the positive set progressing away from zero in the same sequence that the negative set progresses toward zero.

Various schemes have been devised for rendering the above type of binary to analog converter capable of bipolar operation in a system employing a complementary digit scheme. Perhaps the most obvious scheme is to provide a pair of impedance networks, the summing resistors of one being switched between ground and a positive reference voltage and the summing resistors of the other being switched between ground and a negative reference voltage. Positive input numbers are gated to the positively referenced network and negative numbers are gated to the negatively referenced network. The shortcoming of this solution to the problem of bipolar operation is that it calls for duplication of components with a concomitant duplication in the cost of the converter. Actually the cost may be more than doubled since additional circuitry is required for gating input numbers to the proper impedance network. Further, this type of binary to analog converter cannot be used with a complemetary numbering scheme without circuitry to complement the negative magnitude digits prior to their being switched into the negative conversion network.

Another scheme for achieving bipolar conversion calls for but a single impedance network and employs triple-throw switches to apply the reference voltages to the summing resistors. The center terminal of each of the switches is grounded while the other two are connected to positive and negative voltage supplies. For positive input numbers the switches are operated between the ground and positive terminals while for negative input numbers they are operated between the ground and negative terminals. This type of bipolar converter is the same as the type mentioned just above except that it "time shares" a single impedance network instead of having separate networks for positive and negative input numbers.

One difficulty with this second solution to the problem of bipolar operation is that triple-throw switches are more costly than double-throw switches, particularly when they are of the high speed, solid state type. The main difficulty, however, is that the most practical and low cost form of transistorized triple-throw switch employs three silicon transistors having their emitters commoned to the network summing resistor and having their collectors respectively coupled to the positive, ground and negative reference supplies. In this type of arrangement at least one of the transistors is subjected to a reverse potential at its base-emitter junction that is somewhat greater than the sum of the absolute magnitudes of the two reference voltage supplies. Owing to the relatively low base-emitter breakdown voltages of conventionally available silicon transistors, the reference voltages which can be switched into the impedance network by means of such a switch must of necessity be kept at a relatively low level. This severely limits the degree of accuracy obtainable in the converter since the offset voltages inherently introduced by the transistor switches become an undesirably high percentage of the total network voltage drop. Also, like the first mentioned converter, this circuit requires means to complement negative numbers prior to conversion.

A third scheme for achieving a type of bipolar operation in an impedance network having two voltage reference levels has been to connect the utilization circuit with which the impedance network is associated to the network by means of a double-throw switch arranged to provide for selective derivation of the output voltage from across either of two portions of the network. Thus, the output voltage can be taken across those resistors which, for a given input number, are switched to a first of the two voltage supplies or it can be taken across the remaining resistors, which are switched to the second supply. This provides for selective application to the load of two voltage differentials, each having a direction opposite and a magnitude complementary to the other. This arrangement is inherently adapted for operation with a complementary numbering scheme.

Such a circuit, however, is not truly bipolar since the voltage level at the output can never vary outside the range established by the two network reference levels, one of which, of necessity, must be the "zero reference" ground level. The output voltage can thus vary only on one side of ground and without the load switch the network is strictly unipolar in its operation.

It is therefore an object of the present invention to provide an improved bipolar digital to analog converter.

A further object is to provide an improved digital to analog converter readily suited for use in a system where numbers of equal magnitude and opposite sign are represented by complementary digit groups.

Another object is to provide an improved binary to analog converter requiring only double-throw switches.

Still another object is to provide an improved bipolar binary to analog converter which does not require means for reversing the load connection.

Still a further object is to provide a binary to analog converter which requires only double-throw switches and which is adapted to establish output voltages on either side of a base reference voltage level, the latter being supplied at an input to the converter.

In accordance with the present invention, bipolar digital to analog conversion is achieved by placing a voltage device at the output of the converter network, which device responds in accordance with the value of the sign digit to introduce a voltage shift at the output which is equal to the product of the smallest voltage increment obtainable at the output and the sum of the absolute values of the numbers represented by similar combinations of magnitude digits. Thus, in a binary to analog converter adapted to operate with a two's complement numbering system having four magnitude digits and having an output variable in one volt increments, the amount of voltage bias to be introduced in accordance with the invention would be 16 volts since the sum of the absolute values of numbers represented by similar combinations of magnitude digits in a two's complement, four digit binary system is always sixteen. To illustrate this condition, it is seen that the sum of the absolute values of plus seven, represented by the magnitude digit 0111, and minus nine, also represented by magnitude digits 0111, is equal to sixteen.

The present invention may be implemented in any complementary numbering scheme simply by altering the amount of voltage introduced at the output in accordance with the sign digit. Thus, in a binary one's complement system having four magnitude digits it is necessary only to change this voltage shift to fifteen times the smallest voltage increment obtainable at the output, the factor of fifteen being based upon the fact that in a binary one's complement numbering scheme having four magnitude digits the sum of the absolute values of quantities represented by identical magnitude digit groups is always fifteen.

The sign controlled voltage shift necessary for operation of the invention with any complementary digit scheme may be generally expressed as:

$$\Delta \cdot K$$

where Δ represents the smallest voltage increment obtainable at the converter output and K represents the sum of the absolute values of quantities represented by identical magnitude digit groups in the complementary digit scheme employed. For any complementary digit scheme K may be expressed as follows:

For $b$'s complement, $K=b^n$
For $b-1$'s complement, $K=b^n-1$
For $b-2$'s complement, $K=b^n-2$
etc.

where $b$ represents the radix of the system and $n$ represents the number of magnitude digits employed.

The foregoing and other objects, features and advantages of the invention will be apparent from the following more particular description of preferred embodiments of the invention, as illustrated in the accompanying drawings.

Figure 1:
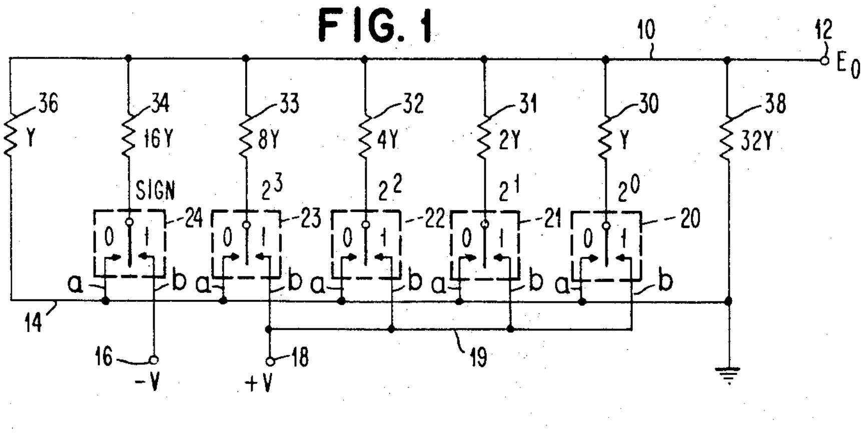
FIG. 1 is a schematic diagram of a binary to analog conversion circuit constituting a first embodiment of the invention wherein input numbers of equal magnitude and opposite sign are represented by two's complement digit groups.

Referring to FIG. 1, a first embodiment of the invention will be described. A plurality of resistors 30, 31, 32, 33, 34, 36 and 38 are connected in parallel to an output bus 10. Also connected to bus 10 is an output terminal 12, where an appropriate voltage indicating or utilization circuit (not shown) may be attached. The opposite ends of resistors 36 and 38 are returned to a source of ground potential while the opposite ends of resistors 30, 31, 32, 33 and 34 are connected to the switch arms of a plurality of single pole double-throw switches 20, 21, 22, 23 and 24, respectively. Each switch has a pair of input terminals *a* and *b*. Terminal *a* of each switch is grounded via a ground bus 14. The *b* terminals of switches 20, 21, 22 and 23 are commoned by means of bus 19 to a reference terminal 18, which is connected to a precision voltage source of magnitude +V. Terminal *b* of switch 24 is connected to reference terminal 16 which is tied to a precision voltage source of magnitude −V. The three reference voltage levels −V, +V and ground may be established by a single precision voltage source in a manner well known to the art.

The switches 20, 21, 22 and 23 correspond, respectively, to the $2^0$, $2^1$, $2^2$ and $2^3$ magnitude digit positions of a binary input number. Switch 24 corresponds to the sign digit of the input number. The switches are adapted to be operated such that when the value of the digit in the associated digit position is a 0 the switch arm is swung to the left to contact switch terminal *a*. Conversely, when the value of the digit in the associated digit position is a 1, the switch arm is swung to the right to contact switch terminal *b*.

The admittance (reciprocal of impedance) of each of the resistors associated with a magnitude digit switch is directly proportional to the numerical weight of the digit position with which the switch is associated. Thus, resistor 30, connected to switch 20 which represents the $2^0$ position, has an admittance equal to Y while the resistors 31, 32 and 33, representing the $2^1$, $2^2$ and $2^3$ digit positions, respectively, have admittance values of 2Y, 4Y and 8Y. Resistor 34, representing the sign digit, has, for reasons which will be subsequently explained, an admittance equal to 16Y, twice that of the resistor associated with the highest order magnitude digit position.

The admittance values of the resistors 36 and 38 are herein arbitrarily established at the levels of Y and 32Y, respectively. It will be appreciated that since these resistors are not associated with switches and are always connected between the output and ground buses 10 and 14, they form an output circuit which adjusts the slope of the output voltage curve, but does not disturb the linearity thereof.

To analyze the change in output voltage $E_0$ with respect to the various combinations of digital input values applied through the switches 20–24, the principle of superposition may be applied since in the present embodiment only the steady state circuit conditions need be considered. Therefore, the voltage contribution of each of the network resistors may be determined individually and the output voltage determined for any given digital input number by algebraically summing the individual voltage contributions of the appropriate network resistors.

The voltage contribution of each resistor may be ascertained by observing the voltage at terminal 12 when the switch associated with the given resistor is switched to its *b* terminal while all other switches are switched to their ground terminal *a*. Thus, in examining resistor 30 in this manner, it is seen that the current flow through it is equal to $$(V-E_0)Y$$

The total current in the remaining resistors is $$E_0(Y+16Y+8Y+4Y+2Y+32Y)$$

Equating these two terms and solving for $E_0$ the voltage contribution of resistor 30 is found to be equal to $V/64$.

Repeating this computation for each of the other three magnitude resistors, it is found that the voltage contribution of the resistor 31 is $V/32$, that of resistor 32 is $V/16$ and that of resistor 33 $V/8$.

Figure 2:
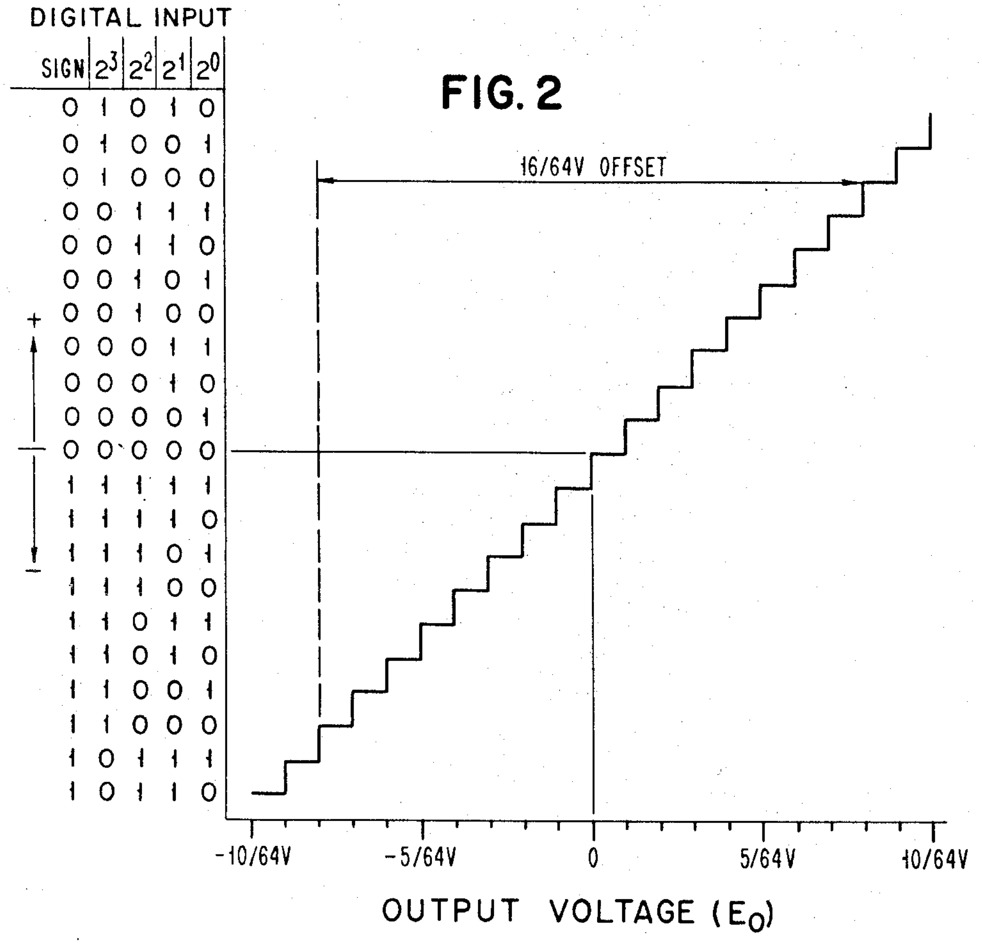
FIG. 2 is a diagram depicting the relationship between the output voltage and various input switch combinations of the circuit of FIG. 1.

Looking now at FIG. 2, it can be seen that the voltage level at output terminal 12 varies in $V/64$ volt increments from zero to $+10V/64$ volts as the input switches 20, 21, 22 and 23 are operated in accordance with the binary representations of the quantities zero through +10, respectively.

It can also be seen from FIG. 2 that there are always sixteen voltage increments separating positive and negative input numbers represented by identical digit groups in the four magnitude digit binary two's complement numbering scheme illustrated. For example, as indicated on the drawing there is a $16V/64$ volt difference between the output voltages produced by the two input quantities +8 and −8, both of which are represented by the magnitude digit groups 1000. It is also seen that the progression of negative numbers toward zero is identical to the progression of positive numbers away from zero. To illustrate, the numbers from −10 to −6 are represented by the following sequence of magnitude digits: 0110, 0111, 1000, 1001 and 1010. The same sequence of magnitude digits is used to represent the positive numbers +6 to +10.

Therefore, in order to produce bipolar operation of the circuit of FIG. 1, means are provided to shift the output voltage by $16V/64$ or $V/4$ volts in accordance with the value of the sign digit of the input number. The value of $V/4$ is arrived at by multiplying the smallest voltage increment obtainable at output terminal 12 ($V/64$ volts) by 16, the sum of the absolute values of quantities represented by identical magnitude digit groups. In the circuit of FIG. 1 this voltage shift is produced by the −V reference voltage applied to the output through the resistor 34 whenever switch 24 is switched to its terminal *b*. Thus, when the sign digit is a 0 indicating a positive quantity, the magnitude digit group 1000 produces an output at terminal 12 of $+8V/64$ volts, signifying a +8. When the sign digit is 1, causing switch 24 to transfer to terminal *b*, the same magnitude digit group produces an output of $-8V/64$ volts. The circuit of FIG. 1 therefore produces, under the control of the sign digit, truly bipolar analog output voltages for two's complement binary input numbers.

Figure 3A:
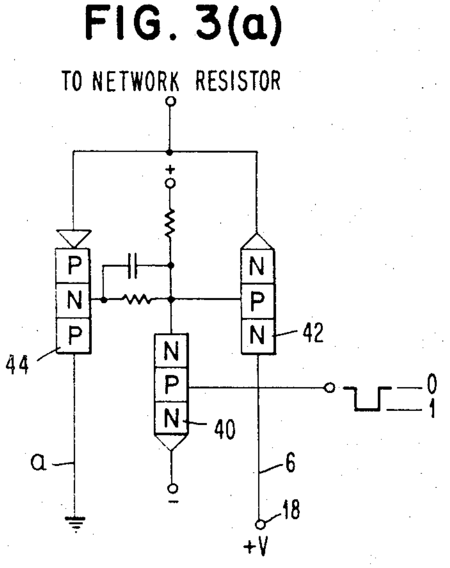
FIG. 3A is a schematic diagram of a high speed, transistorized single pole double-throw switch circuit which may be used to apply the magnitude digits to the circuit of FIG. 1.

FIG. 3A shows a transistorized, high speed switch suitable for use in place of any of the single pole, double-throw switches 20, 21, 22 and 23 schematically depicted in FIG. 1. A first switching transistor 42 is of the NPN type and has its collector connected to the voltage reference +V via the terminal 18. A second switching transistor 44 is of the PNP type and has its collector connected to the ground reference point. The emitters of both transistors 42 and 44 are connected in common to the associated network resistor. A control transistor 40 is of the NPN type and is biased between sources of positive and negative potential at its collector and emitter, respectively. The collector of transistor 40 is connected directly to the base of transistor 42 and is connected to the base of transistor 44 through a RC coupling network.

Input switching signals, supplied by an external circuit such as a flip-flop in a digital input register (not shown), are received at the base of transistor 40. A negative going input pulse indicates that the value of the digit in the particular digital position of the input register has changed from a 0 to a 1 and a positive going pulse indicates a transition from a 1 to a 0. With the input at the 0 level, transistor 40 is biased "on," in turn biasing transistor 44 in saturation and holding transistor 42 in a non-conducting state. This establishes a low impedance conduction path from the associated network resistor through transistor 44 to ground, accomplishing the same result as is accomplished by transferring one of the switches 20–23 of FIG. 1 to its *a* terminal.

When the input switches to the 1 level, transistor 40 turns off, causing the voltage at its collector to shift upwardly. This turns transistor 44 off and places transistor 42 in saturation, connecting the network resistor through a low impedance conduction path to the voltage reference +V. This is the same as switching one of the switches 20–23 of FIG. 1 to its *b* terminal.

Figure 3B:
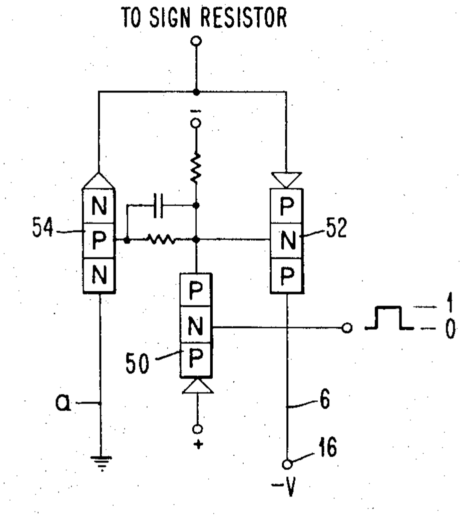
FIG. 3B is a schematic diagram of a high speed, transistorized single pole double-throw switch which may be used to apply the sign digit to the circuit of FIG. 1.

FIG. 3B shows a transistorized, high speed switch which may be used in place of the switch 24 of FIG. 1. Switching transistor 52 is of the PNP type and has its collector connected to the −V reference source via terminal 16. Switching transistor 54 is of the NPN type and has its collector connected to the ground reference source. The emitters of the transistors 52 and 54 are connected in common to the sign resistor 34 (FIG. 1). A control transistor 50 is of the PNP type and is biased between sources of positive and negative potential at its emitter and collector, respectively. The collector of transistor 50 is connected directly to the base of transistor 52 and is connected to the base of transistor 54 through an RC coupling network. Input pulses representing the value of the sign digit of the digital input number are received at the base of transistor 50. These signals may be supplied by an external circuit such as the sign flip-flop of the digital input register. A positive voltage level at the base of transistor 50 represents a digital one and biases transistor 50 in an "off"

state. This keeps transistor 52 in saturation, switching the −V reference source into the network through a low impedance conduction path, and keeps transistor 54 in a nonconducting state. When the input to transistor 50 changes negatively from one to zero, the conduction states of switching transistors 52 and 54 and reversed and the ground reference source is connected to the network through the low impedance path provided by transistor 54.

It is to be understood that the above discussed transistorized switch circuits are only one type that perform satisfactorily with the circuit of the subject invention. Any other single pole, double-throw low impedance switching device may be used.

Figure 4:
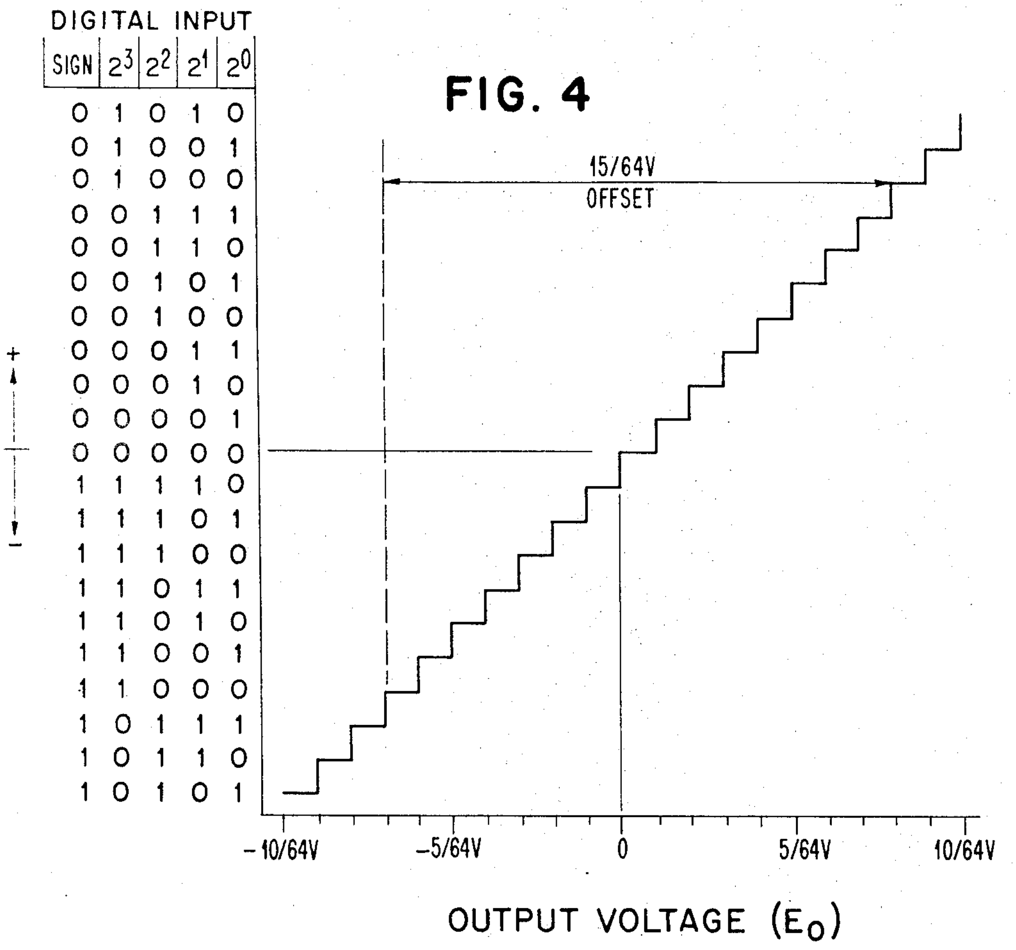
FIG. 4 is a diagram depicting the relationship between the output voltage and various input switch combinations of a binary to analog converter constructed as shown in FIG. 1 but modified to operate with a digit scheme wherein numbers of equal magnitude and opposite sign are represented by digit groups which are the binary one's complement of each other.

FIG. 4 illustrates the relationship between the output voltage and the various input switch combinations of a binary to analog converter constructed identically to the one illustrated in FIG. 1 except that instead of having a negative reference potential of −V connected to terminal 16 there is applied to that terminal a reference potential of −15V/16. As will be noted by observing the binary representation of the negative input numbers depicted in FIG. 4, the circuit thus modified is capable of converting bipolar digital input numbers wherein negative values are depicted as the one's complement of corresponding positive values.

As may be observed from the graph of FIG. 4, there are only fifteen output voltage increments separating like combinations of positive and negative magnitude digits. This is because the digital inputs depicted on the ordinate constitute a portion, ranging from the values −10 to +10, of a four magnitude digit, binary one's complement numbering scheme. In such a scheme the sum of the absolute values of numbers represented by identical magnitude digit groups is fifteen. Therefore, with one's complement inputs, only a 15V/64 volt offset need be introduced through the resistor 34 (FIG. 1) in order to achieve bipolar operation. This is accomplished by placing a 15V/16 reference potential at terminal 16. All other circuit parameters remain the same as shown in FIG. 1.

Drawing from the information provided by the diagrams of FIGS. 2 and 4, a general expression for the sign-controlled voltage shift necessary for operation of the invention with any complementary digit scheme may be derived. When the radix of the number system is $b$ and the number of magnitude digits fed to the converter input is $n$, it can be seen that the sum of the absolute values of numbers represented by identical $b$'s complement magnitude digit groups is $b^n$. The sum of the absolute values of numbers represented by identical $b$–1's complement digit groups is $b^n$–1. For $b$–2's complement the sum is $b^n$–2, and so on for all remaining complement codes within the radix $b$ numbering system.

Therefore, the sign controlled voltage shift called for in accordance with the principles of the invention may be generally expressed as ΔK, where Δ represents the smallest voltage increment obtainable at the converter output and K represents the sum of the absolute values of the numbers represented by identical magnitude digit groups calculated in the manner just discussed.

The above embodiments have, for simplicity, been shown as having only four magnitude input digits. Any number of input digits may be handled simply by adding the desired number of properly weighted network resistors and switches. Also, all network resistors need not be placed in parallel with one another. If desired, groups of parallel resistors such as resistors 30–33 of FIG. 1 may be spaced apart on the output bus by appropriately weighted series resistors in order, for example, to give each parallel group a decimal weight in accordance with a binary-coded-decimal numbering scheme.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A bipolar binary to analog converter for operation in a system where numbers of equal magnitude and opposite sign are represented by complementary digit groups including magnitude digits and a sign digit, said converter comprising:

an output circuit;

voltage supply means for establishing first and second voltage levels;

a plurality of impedance elements connected to said output circuit, each said element corresponding to one of the magnitude digit positions of an input number and having twice the admittance of the element corresponding to the next lower digit position of said number;

a plurality of switches connected to said voltage supply, each of said switches being in circuit with one of said impedance elements and being adapted to selectively apply said first or said second voltage level to said element;

means for operating each said switch in accordance with the value of the input magnitude digit corresponding to the impedance element associated with said switch, whereby a voltage level proportional to the value of said input number is established in said output circuit; and bias means operative in accordance with the value of the sign digit of said input number for shifting the output voltage outside the voltage range of said voltage supply means, said voltage shift being equal in magnitude to the product of the smallest voltage increment obtainable at said output and the sum of the absolute values of the numbers represented by similar combinations of magnitude digits.

2. A bipolar binary to analog converter for operation in a system where numbers of equal magnitude and opposite sign are represented by complementary digit groups including magnitude digits and a sign digit, said converter comprising:

an output circuit;

first, second and third terminals;

means for establishing first, second and third voltage levels at said first, second and third terminals, respectively, said second voltage level being intermediate said first and third levels;

a plurality of impedance elements connected to said output circuit, each said element corresponding to one of the magnitude digit positions of an input number and having twice the admittance of the element corresponding to the next lower digital position of said number;

a plurality of switches connected to said first and second terminals, each of said switches being in circuit with one of said impedance elements and being adapted to selectively apply said first or said second voltage level to said element;

means for operating each said switch in accordance with the value of the input magnitude digit corresponding to the impedance element associated with the said switch, whereby a voltage level proportional to the value of said input number is established in said output circuit;

an additional impedance element connected to said output circuit; and additional switch means in circuit with said additional impedance element to connect said element to said second or said third terminal in accordance with the value of the sign digit of said input number, said additional impedance, when connected to said third terminal, being effective to apply to said output a bias voltage equal in magnitude to the product of the smallest voltage increment obtainable at said output and the sum of the absolute values of the numbers represented by similar combinations of magnitude digits.

3. A bipolar binary to analog converter for operation in a system where numbers of equal magnitude and opposite sign are represented by complementary digit groups including magnitude digits and a sign digit, said converter comprising:

an output circuit;

first, second and third terminals;

means for establishing first, second and third voltage levels at said first, second and third terminals, respectively, said second voltage level being intermediate said first and said third levels and said third level being negative with respect to said first level;

a plurality of impedance elements connected to said output circuit, each said element corresponding to one of the magnitude digit positions of an input number and having twice the admittance of the in pedance element corresponding to the next lower digit position of said number;

a plurality of switches connected to said first and second terminals, each of said switches being in circuit with one of said impedance elements and being adapted to selectively apply said first or said second voltage level to said element;

means for operating each said switch in accordance with the value of the input magnitude digit corresponding to the impedance element associated with said switch, whereby a voltage level proportional to the value of said input number is established in said output circuit;

an additional impedance element connected to said output circuit; and additional switch means in circuit with said additional impedance element to connect said element to said second or said third terminal in accordance with the value of the sign digit of said input number to make the polarity of said output voltage correspond to the sign of said input number.

4. A bipolar binary to analog converter for operation in a system where numbers of equal magnitude and opposite sign are represented by digit groups which are the two's complement of each other and which include $n$ magnitude digits and a sign digit, said converter comprising:

an output circuit;

voltage supply means for establishing first and second voltage levels;

a plurality of impedance elements connected to said output circuit, each said circuit corresponding to one of the magnitude digit positions of an input number and having twice the admittance of the element corresponding to the next lower digit position of said number;

a plurality of switches connected to said voltage supply, each of said switches being in circuit with one of said impedance elements and being adapted to selectively apply said first or said second voltage level to said element;

means for operating each said switch in accordance with the value of the input magnitude digit corresponding to the impedance element associated with said switch, whereby a voltage level proportional to the value of said input number is established in said output circuit; and bias means operative in accordance with the value of the sign digit of said input number for shifting the output voltage outside the voltage range of said voltage supply means, said voltage shift being equal in magnitude to $2^n$ times the smallest voltage increment obtainable at said output.

5. A bipolar binary to analog converter for operation in a system where numbers of equal magnitude and opposite sign are represented by digit groups which are the one's complement of each other and which include $n$ magnitude digits and a sign digit, said converter comprising:

an output circuit;

voltage supply means for establishing first and second voltage levels;

a plurality of impedance elements connected to said output circuit, each said element corresponding to one of the magnitude digit positions of an input number and having twice the admittance of the element corresponding to the next lower digit position of said number;

a plurality of switches connected to said voltage supply, each of said switches being in circuit with one of said impedance elements and being adapted to selectively apply said first or said second voltage level to said element;

means for operating each said switch in accordance with the value of the input magnitude digit corresponding to the impedance element associated with said switch, whereby a voltage level proportional to the value of said input number is established in said output circuit; and bias means operative in accordance with the value of the sign digit of said input number for shifting the output voltage outside the voltage range of said voltage supply means, said voltage shift being equal in magnitude to $2^n-1$ times the smallest voltage increment obtainable at said output.

6. A bipolar binary to analog converter for operation in a system where numbers of equal magnitude and opposite sign are represented by digit groups which are the two's complement of each other and which include $n$ magnitude digits and a sign digit, said converter comprising:

an output circuit;

first, second and third terminals;

means for establishing first, second and third voltage levels at said first, second and third terminals, respectively, said second voltage level being intermediate said first and said third levels and said third level being equal in magnitude, but of opposite polarity, to said first level;

a plurality of impedance elements connected to said output circuit, each said element corresponding to one of the magnitude digit positions of an input number and having twice the admittance of the element corresponding to the next lower digital position of said number;

a plurality of switches connected to said first and second terminals, each of said switches being in circuit with one of said impedance elements and being adapted to selectively apply said first or second voltage level to said element;

means for operating each said switch in accordance with the value of the input magnitude digit corresponding to the impedance element associated with said switch, whereby a voltage level proportional to the value of said input number is established in said output circuit;

an additional impedance element connected to said output circuit, said additional element having twice the admittance of the impedance element corresponding to the highest order digit position of said input number; and additional switch means in circuit with said additional impedance element to connect said element to said second or said third terminal in accordance with the value of the sign digit of said input number, said additional impedance, when connected to said third terminal, being effective to apply to said output a bias voltage equal in amgnitude to $2^n$ times the smallest voltage increment obtainable at said output, thereby making the polarity of said output voltage correspond to the sign of said input number.

7. A bipolar binary to analog converter for operation in a system where numbers of equal magnitude and opposite sign are represented by digit groups which are the one's complement of each other and which include *n* magnitude digits and a sign digit, said converter comprising:

an output circuit;

first, second and third terminals;

means for establishing first, second and third voltage levels at said first, second and third terminals, respectively, said second voltage level being intermediate said first and said third levels and said third level being $^{15}/_{16}$ the magnitude of said first level and of opposite polarity thereto;

a plurality of impedance elements connected to said output circuit, each said element corresponding to one of the magnitude digit positions of an input number and having twice the admittance of the impedance element corresponding to the next lower digit position of said number;

a plurality of switches connected to said first and second terminals, each of said switches being in circuit with one of said impedance elements and being adapted to selectively apply said first or said second voltage level to said element;

means for operating each said switch in accordance with the value of the input magnitude digit corresponding to the impedance element associated with said switch, whereby a voltage level proportional to the value of said input number is established in said output circuit;

an additional impedance element connected to said output circuit, said additional element having twice the admittance of the impedance element corresponding to the highest digit position of said input number; and additional switch means in circuit with said additional impedance element to connect said element to said second or said third terminal in accordance with the value of the sign digit of said input number, said additional impedance, when connected to said third terminal, being effective to apply to said output a bias voltage equal in magnitude to $2^n-1$ times the smallest voltage increment obtainable at said output, making the polarity of said output voltage correspond to the sign of said input number.

References Cited

UNITED STATES PATENTS

| | | | |
|---|---|---|---|
| 2,738,504 | 3/1956 | Gray | 340—347 |
| 2,970,308 | 1/1961 | Stringfellow et al. | 340—347 |
| 2,976,527 | 3/1961 | Smith | 340—347 |

MAYNARD R. WILBUR, *Primary Examiner.*

G. EDWARDS, *Assistant Examiner.*